United States Patent
Mantell et al.

(10) Patent No.: US 7,095,530 B2
(45) Date of Patent: *Aug. 22, 2006

(54) COLOR VECTOR HALFTONING USING A SUCCESSIVE FILLING WITH IMPROVED COLOR REGISTRATION LATITUDE

(75) Inventors: David A. Mantell, Rochester, NY (US); Gaurav Sharma, Webster, NY (US)

(73) Assignee: Xerox Corporation, Stamford, CT (US)

(*) Notice: Subject to any disclaimer, the term of this patent is extended or adjusted under 35 U.S.C. 154(b) by 835 days.

This patent is subject to a terminal disclaimer.

(21) Appl. No.: 10/040,545

(22) Filed: Jan. 7, 2002

(65) Prior Publication Data
US 2003/0128394 A1    Jul. 10, 2003

(51) Int. Cl.
H04N 1/60 (2006.01)

(52) U.S. Cl. .................. 358/1.9; 358/3.19; 358/3.03; 358/3.07; 347/251; 382/162; 345/421

(58) Field of Classification Search .............. 358/1.9, 358/535, 3.26, 534, 536, 540, 502, 3.19, 358/3.03, 3.07; 347/251; 382/162; 345/421, 345/582; H04N 1/52, 1/58
See application file for complete search history.

(56) References Cited

U.S. PATENT DOCUMENTS

| | | | |
|---|---|---|---|
| 4,149,194 A | 4/1979 | Holladay | |
| 5,363,318 A | 11/1994 | McCauley | |
| 5,631,748 A | 5/1997 | Harrington | |
| 5,673,121 A | 9/1997 | Wang | |
| 6,072,591 A | 6/2000 | Harrington | |
| 6,844,941 B1 * | 1/2005 | Sharma et al. ............... 358/1.9 | |

OTHER PUBLICATIONS

Joseph Shu, Chia-Hsin Li, Hakan Ancin, Anoop Bhattacharjya, "Color Stochastic Screening with Smoothness Enhancement", IS&T's NIP 13: 1997 International Conference on Digital Printing Technologies.

Balasubramanian, Raja "Optimization of the Spectral Neugebauer Model for Printer Characterization", Journal of Electronic Imaging, Apr. 1999, vol. 8(2), pp. 156-166.

Balasubramanian, Raja and Maltz, Martin S., "Refinement of printer transformations using weighted regression", SPIE, vol. 2658, 0-8194-2032, Aug. 1996, pp. 334-340.

* cited by examiner

Primary Examiner—Thomas D. Lee
Assistant Examiner—Heather D Gibbs
(74) Attorney, Agent, or Firm—Fay, Sharpe, Fagan, Minnich & McKee, LLP

(57) ABSTRACT

A method is provided for rendering a color image with a plurality of separations with a halftone process using a single screen. The screen is comprised of a plurality of pixel locations with associated threshold values and the image is comprised of a plurality of separation values. The method includes the steps of rendering a first one of the plurality of separations in accordance with the screen, wherein the plurality of pixel locations are turned on or off at a given pixel location based on a comparison of the image separation value at that pixel with the screen threshold value. The rendering of the next color separation is made in accordance with the rendering of the first separation and the screen, wherein for constant image separation values, pixel locations are turned on for the separation at pixel locations disposed in a highest available luminance region having a lowest available threshold value. When successive filling approaches the end portion of available threshold values, overlap filling with earlier rendered color separations occurs before the screen is completely filled.

18 Claims, 4 Drawing Sheets

COLOR VECTOR HALFTONING USING A SUCCESSIVE FILLING WITH IMPROVED COLOR REGISTRATION LATITUDE

FIELD OF THE INVENTION

The subject invention pertains to the art of color image/text printing or display systems, and is especially applicable to a method and apparatus wherein color halftoning (representing a continuous tone image with a binary representation) is implemented with a single stochastic screen for maximal ink dispersion and optimized spatial frequency response in the printing or display process. The invention is particularly applicable for compensating for color misregistration in the printing process causing undesirable color shifts, by adjusting the screen filling process to begin pixel location overlap with preexisting, distinct separations earlier than in a strict vector filling algorithm.

BACKGROUND OF THE INVENTION

In today's business and scientific world color has become essential as a component of communication. Color facilitates the sharing of knowledge and ideas. Companies involved in the development of digital color print engines are continuously looking for ways to improve the accuracy and total image quality of their products.

Color images are commonly represented as one or more separations, each separation comprising a set of color density signals for a single primary or secondary color Color density signals are commonly represented as digital gray or contone pixels, varying in magnitude from a minimum to a maximum, with a number of gradients between corresponding to the bit density of the system. Thus, a common 8 bit system provides 256 shades of each primary color. A color can therefore be considered the combination of magnitudes of each pixel, which when viewed together, present the combination color. Usually, printer signals include three subtractive primary color signals (Cyan, Magenta and Yellow) and a Black signal ("CMYK") which together can be considered the printer colorant signals. Each color signal forms a separation and when combined together with the other separations, forms the color image.

Printers commonly provide a limited number of output possibilities, and are commonly binary, i.e., they produce either a dot (ink drop) or no dot at a given pixel location. Thus, given a color separation with 256 shades of each additive primary color, a set of binary printer signals must be produced representing the contone effect. This process is referred to as halftoning. In such arrangements, over a given area and the separation having a number of contone pixels therein, each pixel value of an array of contone pixels within the area is compared to one of a set of preselected thresholds (the thresholds may be stored as a dither matrix and the repetitive pattern generated by this matrix is considered a halftone cell) as taught for example in U.S. Pat. No. 4,149,194 to Holladay. The effect of such an arrangement is that, for an area where the image is a contone, some of the thresholds in the matrix will be exceeded, i.e., the image value at that specific location is larger than the value stored in the dither matrix for that same location, while others are not. In the binary case, the pixels or cell elements for which the thresholds are exceeded might be printed as Black or some color, while the remaining elements are allowed to remain white or uncolored, dependent on the actual physical quantity described by the data Since the human visual system tends to average out rapidly varying spatial patterns and perceives only a spatial average of the micro-variation in spot-color produced by a printer, the halftone process described above can be used to produce a close approximation to the desired color in the contone input.

The dither matrix of threshold values is often referred to as a "screen", and the process of generating the binary image from the contone image using the screen is called "screening" Conventional digital halftones start as a number of isolated dots which grow bigger as more colorant is requested on the paper. These screens are referred to as clustered-dot screens. The fundamental rate at which the dots in a clustered dot screen are repeated is commonly referred to as the screen's spatial frequency [Note R. Ulichney, "Digital Halftoning", MIT Press, Cambridge, Mass., 1987]. The higher the screen spatial frequency, the finer and smoother appearing the image and also the greater is the capacity for the dots to represent fine detail in the image. Dithering creates problems in color document reproduction where the repeating pattern of a screen through the image, when superposed over similar repeating patterns in multiple separations, can cause moiré or other artifacts, particularly in a printing system with less than ideal registration between separations.

Stochastic, or non-periodic screening is an alternative to conventional clustered dot screens. Instead of producing dots that grow with increased colorant on paper, the stochastic screening method produces a well-dispersed pattern of isolated dots at spaced pixel locations. Thus there is no fundamental periodicity in the dots, instead the design of the screen attempts to produce patterns with pleasant noise characteristics. The pleasant noise characteristics are achieved by designing the screen so as to distribute the noise energy in the region of high spatial frequency, where the human visual system has a significantly reduced sensitivity. In this respect, U.S. Pat. No. 5,673,121 to Wang, discloses a stochastic halftone screening method for designing an idealized stochastic screen and is herein incorporated by reference as it discloses a particular stochastic screen useful in implementation of the subject invention, as will be more fully explained below. One of the advantages of stochastic, or non-periodic screening over periodic screening, is the suppression of moiré.

In vector halftoning, typically, a single stochastic screen is filled by the CMYK inputs rather than using four separate ones. This eliminates problems with moiré, reduces the amount of memory needed to store halftone screens, and provides better placement of dots from different separations A simplified example of a successive filling algorithm can be described so that for each pixel, the separations are halftoned in the order darkest to lightest:

1. Black is processed first, the screen is filled as in a normal halftone.
2. Then one of the colors (cyan) is added. Locations that already have black dots are avoided.
3. Then another color (magenta) is added. Locations that already have black or cyan dots are avoided.
4. Finally yellow is added.

A formula for each of the steps would look something like:

IF ColorIn+PrevSum−PrevSumOut>=threshold
   THEN out=255,

ELSE out=0

Where ColorIn is the current color input. PrevSum is the sum of the requested amounts of previously processed colors. PrevSumOut is the sum of previous outputs (255 for each color that has previously been printed at the current location). Threshold is the value for the current pixel Note that for black, Sum and PrevSumOut are zero, so the formula simply reduces to standard halftoning (Kin>=threshold . . . ).

Vector halftoning allows multiple colors to share the same screen, but to spatially occupy different portions. Each successive color continues to fill the same screen until the screen is filled After that one starts overlapping colors in an optimized manner. A difficulty occurs around the point where one fills the screen completely with more than one color. The printed image becomes extremely dependent on inter-color alignment.

More particularly, a significant issue can arise at the point where a combination of two or more colors approaches 100-percent coverage. The alignment between colors becomes critical. Small misalignments can cause significant color shifts and grain variations.

If the color-color alignment cannot be guaranteed, then outputs varying between aligned and unaligned must be expected. In many printers, electronic calibration procedures are included that allow the customer to select the best alignment. The worst scenario would be if the misalignment varies across the page or printhead due to any of a number of possible factors related to mechanical structures or printhead defects. Then no amount of alignment procedures alone will suffice. The issue becomes more important at higher speeds with multiple printhead assemblies.

However, awareness of manufacturing tolerances and empirically obtained operational data for a particular print system can provide a fairly decent basis for predicting such misregistration errors in the system family. Such errors, e.g, a fraction of a pixel to a whole pixel, or in some print systems even greater, when consistent in occurrence, should provide a reliable factor in a compensation scheme to correct or at least compensate for the misregistration.

Accordingly, there is a need for an improved halftoning algorithm that enhances system robustness against color-to-color misalignment errors. The algorithm should give rise to more accurate halftone textures and better ink dispersion than what is achieved with strict vector halftoning.

BRIEF SUMMARY OF THE INVENTION

The proposed algorithm processes image separations sequentially using a single halftone screen. For the purpose of illustrating the algorithm, its operation is described for spatially uniform images, i.e., images for which the values of the individual separations are constant. The actual algorithm is directly applicable to spatially varying images and can be applied on a pixel-by-pixel basis using only the color separation values for the pixel being processed without requiring buffering of neighboring pixel locations. Essentially, the system starts overlapping color separations at selected pixel locations even before the screen is completely filled.

The subject invention describes a method for halftoning a color image using a stochastic screen. The halftone algorithm renders the color separations (for instance C, M, Y, and K) of the image sequentially according to a chosen ordering. The first separation is halftoned using the normal process of screening. Each subsequent separation is halftoned so as to minimize overlap with the previously halftoned separations and to result in optimal spatial distribution of the dots as defined by the stochastic screen. For the illustration of the invention, this disclosure will often assume that the image to be halftoned is a spatially constant image, though it should be clear that the invention and its benefits are equally applicable to other images. For a spatially constant image, when halftoning a separation in the presence of previously halftoned separations, one exemplary embodiment for practicing the method of this invention places the on pixels for the separation being halftoned on the lightest available pixel regions and within these regions at the spatial locations corresponding to the lowest thresholds for the stochastic screen. However, other methods of overlap are also intended to fall within the scope of the invention. For example, the overlap could be distributed between secondary colors in some proportion related to the concentration of the individual separations. In other words, by giving some input C, M, and Y a sum greater than 255, one could get some C, M, Y. Red, Green, and Blue with the quantities of R, G, and B being related to the amount the each primary. Regardless, in the exemplary embodiment, the rule for placement of new dots on the lightest available region achieves maximal ink dispersion, i.e., there is no overlap of inks unless necessary and overlap of lighter inks occurs before overlap of darker inks and the rule of placing the new dots first in the lowest available thresholds, ensures that the overall spatial frequency characteristics are optimized by having the darkest dots most uniformly distributed, then the next darkest dots and so on. Importantly though, when the rendering of successive color separations (i.e., a first and a next color) comes within a preselected number ("Delta") of threshold values of filling the screen, continuing rendering includes overlapping the first one of the separations with the next one whereby color inaccuracy due to separation misalignment is diminished for improved color registration latitude.

In accordance with another aspect of the present invention, the overlapping comprises a fraction of the continuing rendering of the screen, e.g., fifty percent, at a lowest threshold value of the first one of the separations.

In accordance with another aspect of the present invention, a rendering apparatus is provided for a color image represented in a halftone process by a plurality of separations. A halftoning screen generator produces a screen having threshold values at pixel locations, wherein the values can be applied to contone image signals to derive a binary or multilevel image signal suitable to drive the apparatus. A processor renders the color separations in accordance with the screen, wherein for constant image separation values, pixel locations are turned on for a selected separation at the pixel locations disposed in a highest available luminance region having a lowest available threshold value for a predetermined number of available threshold values less than a complete filling of the screen, and thereafter an overlap filling occurs for a portion of the turned on pixel locations. The processor renders the overlap filling by alternatively assigning open pixel locations associated with available threshold values and turned-on pixel locations associated with a rendered separation.

One advantage of the present invention is a color halftoning process which enhances color registration latitude and system robustness.

It is another advantage of the subject invention that the process can be applied to a wide variety of halftoning algorithms including binary or multilevel successive filling screening systems.

Other advantages and benefits of the present invention will become apparent to those of ordinary skill in the art upon a reading and understanding of the following detailed description of the preferred embodiments.

BRIEF DESCRIPTION OF THE DRAWINGS

The invention may take form in various components and arrangements of components. The drawings are only for purposes of illustrating the preferred embodiments and are not to be construed as limiting the invention. Where.

DETAILED DESCRIPTION OF THE PREFERRED EMBODIMENT

Figure 1:
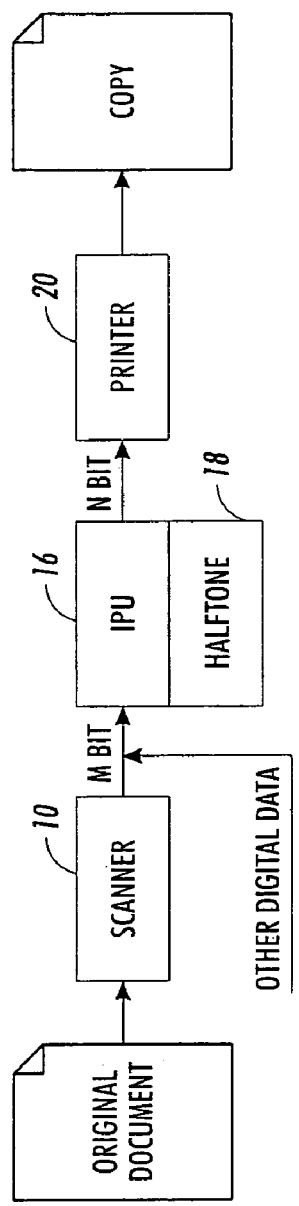
FIGS. 1 and 2 represent a halftoning system in which the present invention finds use.

Referring now to the drawings wherein the showings are for purposes of illustrating preferred embodiments of the invention only and not for limiting same, the invention describes a way of halftoning a color image using a single stochastic screen. The different separations are processed in order of decreasing luminance modulation (i.e., successive separations produce smaller and smaller changes in luminance, for printing this order is from the darkest printing separation to the lightest) and are biased so as to target different thresholds of the stochastic screen. The biasing is done so as to achieve three objectives: (1) "area coverage" for each color is preserved, (2) the inks are maximally dispersed, i.e., there is no overlap unless necessary and overlap of lighter inks occurs before overlap of darker inks, and (3) the spatial frequency optimization of the stochastic screen is used optimally by having the darkest dots occupy the lowest thresholds.

Figure 3A:
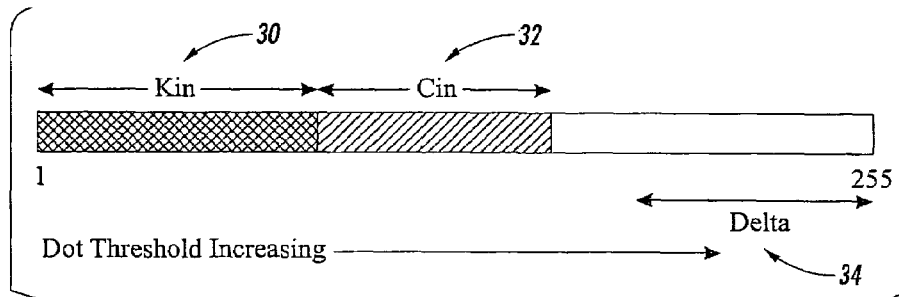
FIGS. 3a–3c comprise exemplary representations of the invention as applied to color separation dot filling in terms of thresholds between 1 and 255, i.e., an 8-bit binary signal representation.
Figure 3B:
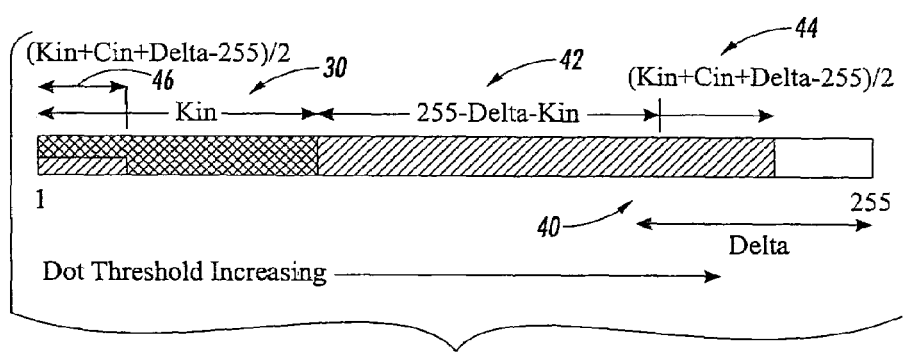

A principal feature of this invention is to process the image separations in order of decreasing luminance modulation, for a CMYK printer this order is typically K, C, M, Y or K, M, C, Y. For each separation, the number of dots printed is decided by the input digital value for that separation and the placement of the dots is done so as to have the dots first fill-in regions of highest luminance and then move to regions of successively decreasing luminance. In each region of constant luminance, the dots are placed so as to occupy the lowest available thresholds in the stochastic screen first. Since the screen is designed to have optimal frequency response when the lower levels are filled first, this method ensures that the darkest dots occupy the regions with the best frequency response characteristics. The above goals are achieved by first biasing each separations digital value suitably and then halftoning each separation using the same basic stochastic screen. For the present description, the example of an 8-bit CMYK image is used, though the method could be generalized to any number of bits and other printing inks. Furthermore, the invention is described as using a 256×256 stochastic screen for explanation, any size stochastic screen can be used in practice The stochastic screen is assumed to be linear in the number of pixels turned on. The stochastic screen is an array of thresholds between 1 and 255 (FIGS. 3a–3b). When halftoning an image (one separation), a pixel is turned on if the image value at that pixel exceeds the threshold. The linearity of the dot implies that when a constant image with value V is halftoned, the fraction of the pixels turned on in the output is V/255 (or the nearest obtainable approximation) for all values of V between 0 and 255. In order to better explain the idea of this invention, the dot is represented by its thresholds as shown in FIG. 3a The linear array in FIG. 3a represents the thresholds of the dot in increasing order from left to right, going from 1 to 255. In this representation, each threshold represents all the pixels that get turned on just when the image reaches that value. A particular threshold or threshold region of the dot is filled by a given separation to indicate that the dots of that separation completely cover the pixels corresponding to that threshold/threshold region One example of how the stochastic screen could be designed is in accordance with the method described in U.S. Pat. No. 5,673,121 to Wang. This method optimizes the screen spatial frequency characteristics, when it is filled successively starting from a threshold of 1 and moving up to a level of 255. In the particular two color example of FIG. 3a, a portion of its thresholds are filled by black Kin 30, and a portion by cyan Cin 32 The cumulative total of Kin+Cin is substantially less than the total available threshold values (i.e., substantially less than 255) in the exemplary screen. The Figure also illustrates that there is a range "Delta" 34 comprising a terminal end portion of the threshold values which when reached will, in accordance with the present invention, trigger adjustment from the normal filling processes of the successive filling algorithm. Delta is an input variable which can be modified in accordance with the particular display systems involved, as will be discussed more fully below.

FIG. 3b illustrates an application of the subject invention where the cumulative total of threshold values comprised of Kin+Cin is greater than the threshold point value of 255–Delta. It is a feature of the invention that once the threshold value comprising 255–Delta is reached, then rather than continuously successively filling all of the open threshold values in the screen, that only a portion are assigned to open threshold values, while others are overlapped into the lowest available threshold values that have previously been filled by the black printing and corresponding pixel locations. More particularly, the assigned black threshold value, Kin in FIG. 3b is the same as in FIG. 3a. However, the required threshold values to be assigned cyan are greater than that shown in FIG. 3a and in fact with Kin cumulatively exceed the threshold value defined by 255–Delta 40. Thus, the area comprising threshold values that are filled with the halftoning algorithm and are unaffected by the modification of the subject invention comprise the area defined as 255–Delta–Kin 42, but thereafter, only a portion of the available threshold values within the Delta range are assigned Cin. This is indicated in the Figure as (Kin+Cin+Delta–255)/2 44. In this particular illustration of the invention, this sharing of the assignment of Cin within the Delta range is split evenly, i.e., fifty percent, between the open thresholds and the overlapping of the thresholds previously assigned within the range of Kin. The overlapping region is defined as (Kin+Cin+Delta–255)/2 46. Of course, alternative percentage of portions could be alternatively selected depending upon the needs of the particular system involved The percentage need not be constant over the whole overlap region. For example, the overlapping percentage could start out small to provide a more gradual turn on of the overlap A formulation for the subject halftoning method for an input CMYK image with 8-bits input per separation and assuming a rendering order of K, C, M, Y is given by:

IF ColorIn+Foverlap+PrevSum–
    PrevSumOut>=threshold THEN out=255

ELSE out=0

With reference to FIGS. 3a and 3b, Foverlap is defined is as follows.

If (Kin+Cin<=(255−Delta) Foverlap=0 (overlap unnecessary),

Else if (Kin+Cin>+(255+Delta)) Foverlap=0 (at 100 percent coverage already)

else if (Kout=0) Foverlap=(255−Kin−Cin−Delta)/2, else if (Kout=255) Foverlap=(255−Kin−Cin+Delta)/2.

As noted above, for black, Kin, Foverlap is zero, for cyan, Cin, the above formulation defines the Foverlap shown in FIG. 3B. Foverlap is thus negative when Kout equals zero and positive when Kout equals 255. This causes fewer cyan-only pixels within the overlap region and more cyan-black pixels. For an increase in Cin within the overlap region, this particular variation causes half the additional cyan to be printed on previously white pixels and half on previously black pixels as shown in FIG. 3b.

The extension of magenta is straightforward (an inverse screen for yellow is assumed to simplify calculations, wherein the screen thresholds are obtained from the original screen thresholds by subtracting from 256). Situations are also possible where the sum is near 2×255 or 3×255, which would be handled in a similar manner. In those cases one can also consider other alignment stress inputs. For example, when magenta approaches 100% overlap of the cyan-only pixels.

The value of Delta should be predetermined with some care If one expects misalignments as large as one pixel, then a value of 100 for Delta may in fact be necessary But, if the alignment is better, then a smaller value would suffice.

A more subtle point is that there are some input values for which it is necessary to reduce the overlap. For example, if Kin is less than Delta, then it is possible that an incorrect number of pixels can be turned on for cyan with the above algorithm These cases can, however, be readily accounted through a simple modification. In the subject implementation, the variable is defined:

Delta Tmp=min(Kin,Delta)

which replaces Delta in the above formula. Delta Tmp may be limited in a number of other cases as well, such as if 255−Kin<Delta then Delta Tmp needs to be set to min(Delta Tmp, 255−Kmin). Additional cases arise when considering magenta as well.

Many other possibilities are of course possible. If, within the Delta region, all the additional cyan is desired to always overlap with black (rather than be equally distributed between the white and black pixels) then the formula would be:

| Foverlap = (255 − Kin − Cin − Delta) | Kout = 0 |
| Foverlap = Delta | Kout = 255 |

Obviously, anything in between would be possible as well.

The chosen examples are simple linear functions for the overlap. This is neither necessary for the algorithm to work nor for it to be practical. A look up table could provide an efficient means of calculating Foverlap given any functional form.

Additionally, values for Foverlap have been used which affect the thresholds equally for white or black pixels. In other words, if the screen is linear (equal number of levels for each threshold), the number of printed cyan pixels is proportional to the input This restriction is not necessary. Just as one might want to use a non-linear screen, one could also use an overlap function that weights the overlapped and non-overlapped differently. Furthermore, these could depend on the cyan or black input values.

Figure 4:
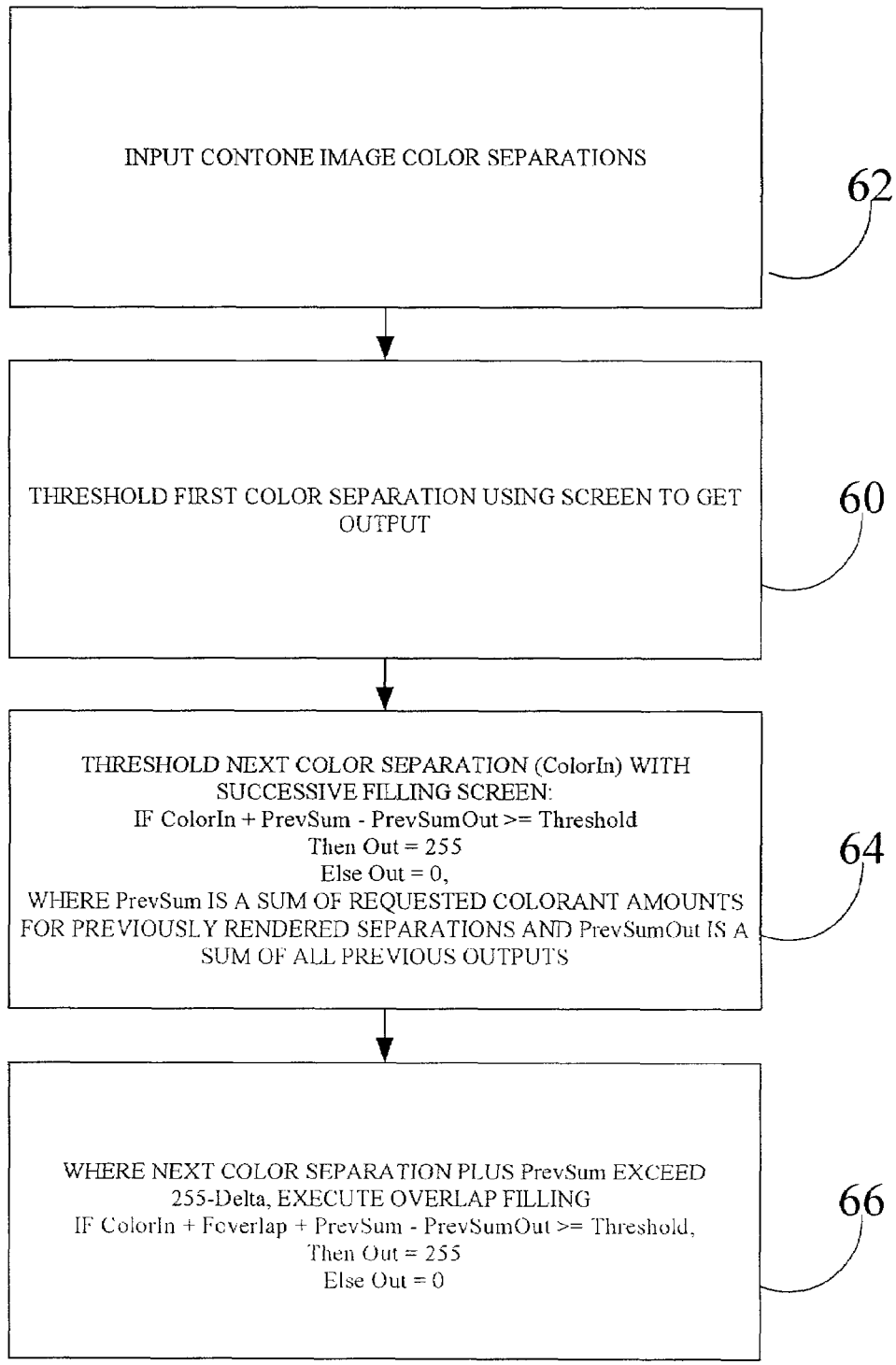
FIG. 4 is a flowchart illustrating the steps of the method of the subject invention.

The steps of the subject invention are more particularly illustrated in FIG. 4 wherein, and continuing with exemplary successive filling algorithm for the two-color case, an input image is comprised of color separations with requested amounts Kin and Cin 60. The first color separation is thresholded to define the output value for the K separation 62. The normal filling process is identified in block 64 to continue successive filling of available thresholds with the next color separation. The subject invention is particularly identified in block 66 wherein a modification occurs for overlap when the sum of the color separations exceeds the threshold value defined as 255−Delta, wherein Delta is a preselected value. Foverlap is defined in the formulation above. As explained therein, successive filling comprises an equal splitting of successive threshold values between the open threshold values, and threshold values previously assigned to an earlier assigned color separation.

Figure 3C:
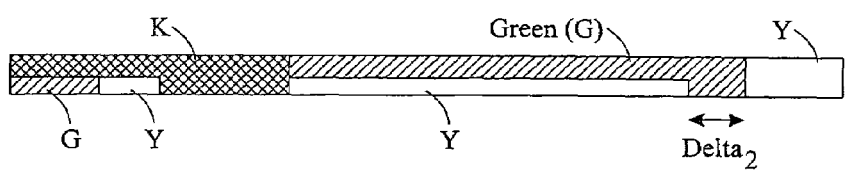

There are many other ways to implement the invention and the following illustrate a few:

1) In three colors where the two lighter ones are equal. Eg. Cin=Yin=255−Kin In this case one would normally print K and Green (C+Y) (no white space) without overlap If we want to improve registration independence we could print some combination of K, C, Y, G, KC, KY and maybe even white. There are many ways to do this. For example, one would apply an additional $Delta_2$ (a different delta factor than the one shown above) to the lightest color (so one would get only K, KY, C, and G).
2) A different method with a similar result is that since the first two colors (K and C) fill the screen one might render them as if they were the only two colors (just like in FIG. 3b) Then add the third color (Y) filling in the blank portion of the screen then covering part of the cyan. Finally as the yellow starts to fill the portion of the screen not covered by black, the $Delta_2$ is applied. So the output looks like FIG. 3c.
3) Another embodiment would be where there are four colors and the lightest two colors are equal.
4) Four colors where the second darkest is equal to the coverage of the other two With reference now to FIG. 1, which shows general system requirements representing the invention, an electronic representation of an original document (an image) from an image input terminal such as scanner 10 derives electronic digital data in some manner, in a format related to the physical characteristics of the device, and commonly with pixels defined at m bits per pixel. Common color scanners, such, for example, Xerox 5775 Digital Color Copiers, or the Pixelcraft 7650C, produce 8 bit/pixel data, at resolutions acceptable for many purposes. Since this is a color document, the image is defined with two or more separation bitmaps, usually with identical resolution and pixel depth. The electronic image signals are directed through an image processing unit (IPU) 16 to be processed so that an image suitable for reproduction on image output terminal or printer 20 is obtained Image processing unit 16 commonly includes a halftone processor 18 which converts m bit digital image signals to n bit digital image signals, suitable for driving a particular printer, where m and n are integer values. It is also well within the contemplation of the present invention, to derive images electronically. In such cases, the images may be represented by a page description language file, describing the appearance of the page. In such a case, the IPU might include a processing element for decomposition of the page, and color conversions elements for providing appropriate signals for driving a printer.

Figure 2:
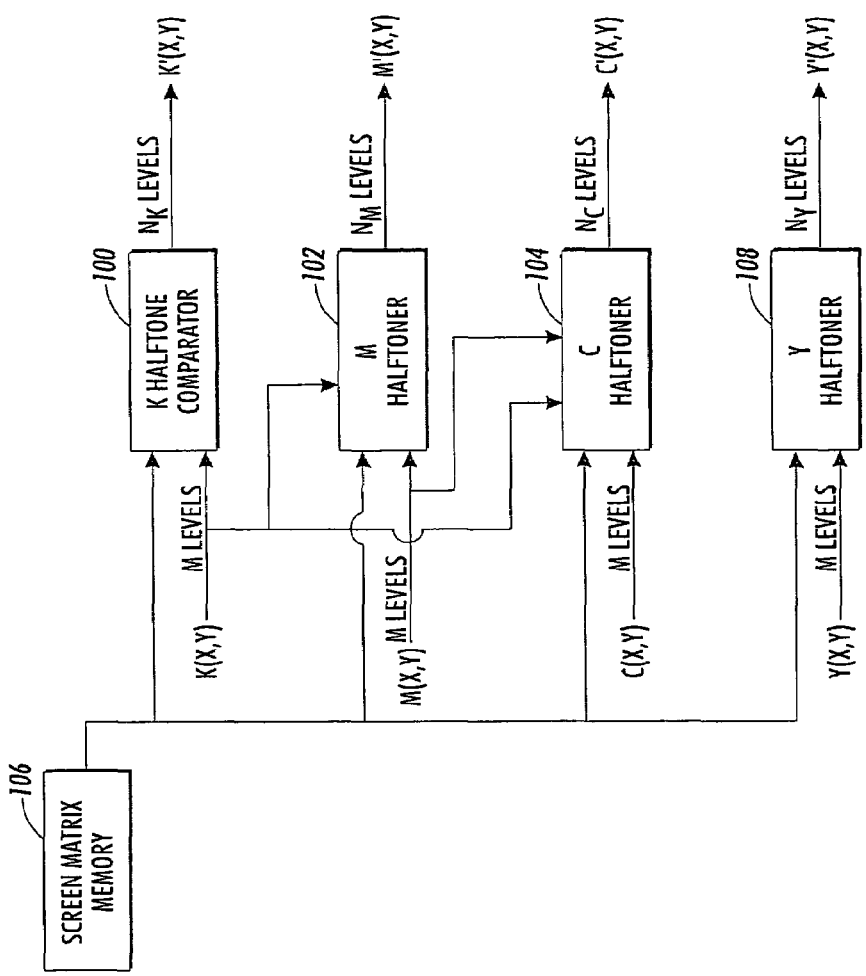

FIG. 2 shows the halftone processor 18 operational characteristics. In this example, there is illustrated a color processing system, using four separations C(x, y), M(x, y), Y(x, y), K(x, y), obtained and each processed independently for halftoning purposes to reduce an m-bit input into an n-bit output. It will be appreciated that the invention is also applicable to the "single separation" or black and white reproduction situation as well. Accordingly, a source of screen matrix information is shown, screen matrix memory 106, which provides one input to each comparator 100, 102, 104, and 108 for each separation, where the other comparator is the m bit separation bitmap. The output is m bit output, which can be directed to a printer. This illustration is highly simplified, in that distinct screen matrices may be supplied to each comparator.

The invention has been described with reference to the preferred embodiment Obviously, modifications and alterations will occur to others upon reading and understanding the proceeding detailed description. In particular, the rule of placing the dots for a new separation on lightest available region and in the lowest available thresholds may be satisfied in many different mathematically equivalent ways. For instance, instead of modifying the image, the threshold array may be modified by an equivalent amount, or instead of comparing a pixel to threshold the threshold may be added to the image and compared to a constant value. In addition, the modification amounts stated in the algorithm described earlier may be defined in several different mathematically equivalent ways. Also, while the invention has been described for specific application to a stochastic screen, its benefits of minimal overlap can also be realized for other types of screens Finally, just like other halftoning methods the method of the present invention may also be utilized in display applications. It is intended that the invention be construed as including all such modifications and alterations insofar as they come within the scope of the appended claims or the equivalents thereof.

Having thus described the preferred embodiment, we now claim:

1. A method of rendering a color image with a plurality of separations on an output device, with a halftone process using a single screen for said plurality of separations, wherein the screen is comprised of a plurality of pixel locations with associated threshold values and the image is comprised of a plurality of separation values, the method comprising steps of:
    rendering a first one of the plurality of separations in accordance with the screen, wherein the plurality of pixel locations are turned on or off at a given pixel location based on a comparison of the image separation value at that pixel with the screen threshold value,
    rendering a next one of the color separations in accordance with the rendering of the first separation and the screen, wherein for constant image separation values, pixel locations are turned on for the separation at pixel locations disposed in a highest available luminance region having a lowest available threshold value; and
    when the rendering of the first and next ones of the color separations comes within a preselected number of threshold values of filling the pixels of a luminance region, continuing rendering includes overlapping the luminance region with a next luminance region whereby color inaccuracy due to separation misalignment is diminished for improved color registration latitude.

2. The color rendering method in claim 1 wherein the halftone screen is a stochastic screen.

3. The color rendering method as defined in claim 2 wherein the preselected number of threshold values is based upon an empirical determination of accuracy of inter-separation alignment of the output device.

4. The method in claim 3, wherein the renderings are printings.

5. The color rendering method as defined in claim 3, wherein the renderings are displays on a screen.

6. The color rendering method as defined in claim 3 wherein the overlapping comprises a fraction of the continuing rendering of the screen.

7. The color rendering method as defined in claim 6 wherein the fraction comprises fifty percent.

8. The color rendering method as defined in claim 1 wherein the overlapping begins at a lowest threshold value of the first one of the separations.

9. In a color printing system, a method of printing a color document with a halftone process using a single screen for a plurality of color separations wherein the screen is comprised of a plurality of pixel locations associated with successive threshold values, the method comprising steps of:
    printing a first one of the plurality of color separations in accordance with the screen, wherein a corresponding first set of screen pixel locations associated with a first set of threshold values are filled by the first one of the color separations; and,
    printing a next color separation in accordance with the screen, wherein a corresponding second set of screen pixel locations are filled by the next separation, the second set having threshold values successive to the first set of threshold values, and before the printing of the next color separation fills the screen, overlapping the printing of the next color separation with the first one of the separations at a portion of the first set of screen pixel locations.

10. The color printing method as defined in claim 9 wherein the single screen comprises a stochastic screen representing a set of pixel elements having a range of the successive threshold values, and the printing of the next color separation comprises filling second pixel elements having next successive threshold values to threshold values associated with pixel locations filled by the printing of the first one, and wherein the overlapping begins within a predetermined number of available threshold values from the filling of the screen.

11. The color printing method as defined in claim 10 wherein the overlapping comprises an overlap filling first made at a pixel locations disposed in a highest available luminance region having a lowest available threshold value.

12. The color printing method as defined in claim 10 wherein the overlapping comprises alternatively assigning pixel locations to the next color separation from the first set of pixel locations filled by the first one of the color separations and the available threshold values.

13. A rendering apparatus for a color image represented in a halftone process by a plurality of separations, comprising:
    a halftoning screen generator for producing a screen having threshold values at pixel locations, wherein the values can be applied to contone image signals to derive a binary image signal suitable to drive the apparatus; and, a processor for rendering the color separations in accordance with the screen, wherein for constant image separation values, pixel locations are turned on for a selected separation at the pixel locations disposed in a highest available luminance region having a lowest available threshold value for a predetermined number of available threshold values less than a complete filling of the screen, and thereafter an overlap filling occurs for a portion of the turned on pixel locations.

14. The rendering apparatus as defined in claim 13 wherein the screen comprises a stochastic screen.

15. The rendering apparatus as defined in claim 13 wherein the processor renders the overlap filling by alternatively assigning open pixel locations associated with available threshold values and turned-on pixel locations associated with a rendered separation.

16. A method of rendering a color image with a plurality of separations on an output device, with a halftone process using a single screen for said plurality of separations, wherein the screen is comprised of a plurality of pixel locations with associated threshold values and the image is comprised of a plurality of separation values, the method comprising steps of:

rendering the colors successively in a predetermined order until the sum of the colors reaches a threshold value, and when the sum of the colors exceeds the threshold value, overlapping at least two of the separations.

17. The method of claim 16 wherein the screen comprises a plurality of luminance regions and when an increase in the screen approaches within a threshold of filling the pixels of one of the luminance regions, continued rendering includes beginning to fill the next one.

18. The method of claim 17 wherein calculating the threshold value based on the values in each of the separations.

\* \* \* \* \*